Nov. 4, 1930.                  C. R. SHORT                  1,780,724
                            RUBBER ENGINE SUPPORT
                            Filed Oct. 20, 1926
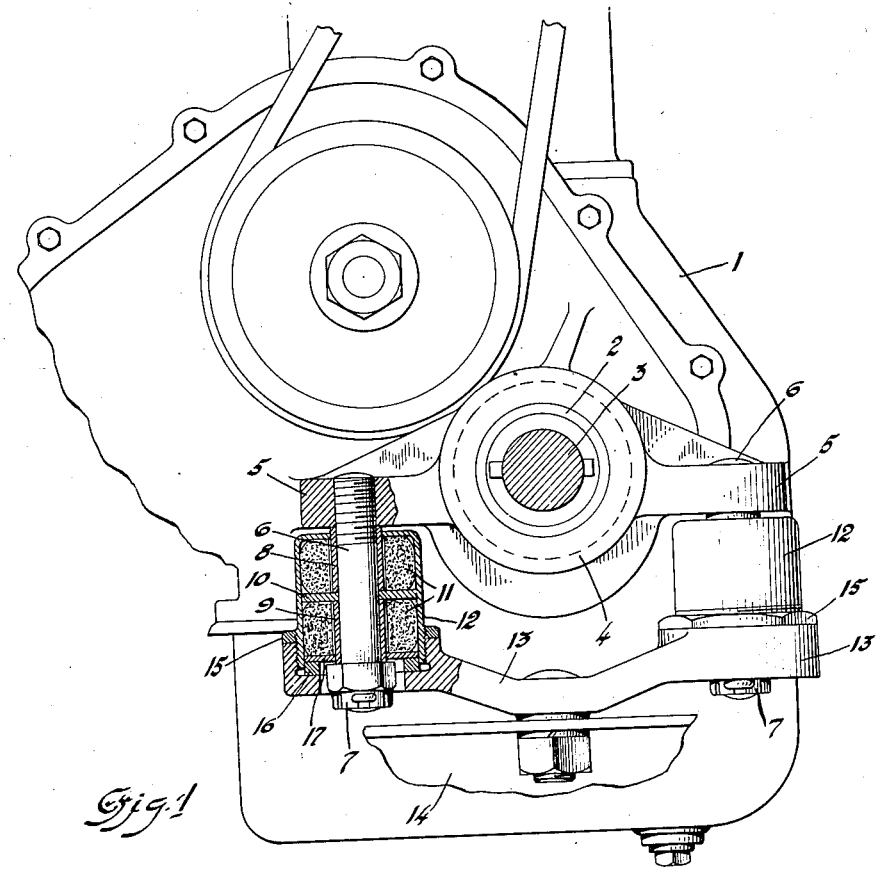
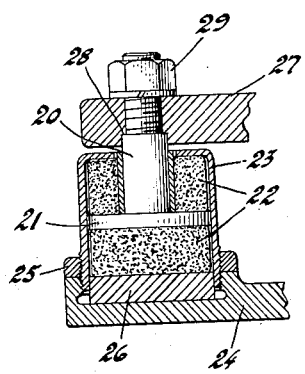
Inventor
Charles R. Short Patented Nov. 4, 1930

1,780,724

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

RUBBER ENGINE SUPPORT

Application filed October 20, 1926. Serial No. 142,945.

This invention relates to resilient supports, particularly engine mountings, and one of the primary objects of the invention, is to provide a mounting for dampening vibrations within a definite low range and rigidly resist movements of larger amplitude, as well as for limiting the tendency toward vibratory periodicity.

The operation of internal combustion engines, especially those of the four cylinder type as employed in automobile construction, result in vibration of the entire motor body in its supporting frame. While these relative movements are of but a few thousandths of an inch, their constant regularity, transmitted thru the automobile frame causes damage and breakage to the frame parts, as well as being quite disagreeable to the nervous system of automobile passengers.

Resilient mountings to absorb such vibrations have been provided, but they are generally of unrestrained flexibility, which is disadvantageous in that the vibrations are permitted to multiply themselves to build up periods of unlimited scope. Road bumps or other violent shocks also cause relative movements of large amplitude and affect the operative connections with the engine.

The present invention contemplates the use of a completely confined flexible element, such as rubber, having a predetermined or ascertained deformation or compression, necessary to dampen a specific range of vibration. The body of flexible or resilient material is maintained within certain definite bounds, and therefore, only movements of predetermined value are cushioned.

Referring more specifically to the accompanying drawing, Figure 1 is a front elevation of a portion of an automobile internal combustion engine with a preferred form of the present invention, partly in section, and applied as a front support of a three point suspension arrangement. Figure 2 is a vertical sectional view of a modified form of mounting.

While for illustrative purposes, the invention will be described as applied to the central front suspension point, it will be understood, that it may also be used as a rear or side engine support, as well as for other obvious purposes, such as automobile body mountings and the like.

The engine, indicated by the reference character 1, has a circular projection or housing 2 at the front thereof, thru which extends a part of the engine crank shaft 3, for engagement with a hand crank in case it is desired to rotate the crankshaft by manual effort, as is sometimes necessary to start the engine. The hanger or bracket 4 surrounds the projection 2 and has lateral arms 5 on opposite sides thereof. Screw threaded into the under side of each arm 5 is a stud or pin 6, with the nut 7 at its lower end and a pair of intermediate spacer sleeves 8 and 9 to maintain at a mid-point on the stud 6, a circular plate or disc 10. Surrounding the respective sleeves 8 and 9 and on opposite sides of the plate 10, is a pair of compressible elements 11, such as high grade soft rubber, and completely enclosing the compressible material is a housing or casing 12. The housing 12 is adjustably screw threaded into an opening of the bracket arm 13, carried by a transverse bar 14 of the chassis frame, and has a lock nut 15 to hold it in adjusted position. A ring 16 resting on the bottom of opening in the bracket arm 13, supports a plate or disc 17 to close the bottom of the housing. The top and bottom edges of the body of rubber are preferably beveled or rounded as shown in the drawing to provide clearance into which the rubber may flow when compressed or deformed.

The construction has been designed with a view of simplicity and economy of manufacture. Without departing from the principle of the invention the particular construction may take other forms, as for instance, as illustrated in Figure 2, wherein the stud 20 has an enlarged flattened head 21 disposed between a pair of compressible elements 22, completely enclosed within the housing 23. In this instance, the housing is secured in the same manner as before described, by being screw threaded into the supporting arm 24 and held in place by the nut 25. The plate 26 resting on the bottom of the opening extends into the housing 23, against the bottom of the lower compressible element 22, to close the lower end, and displacement space is provided by a slight clearance between the housing and sides of the elements 22. The opening in the supported arm 27, thru which the stud 20 extends, is shouldered at 28 to bear against a corresponding shoulder on the stud, and the nut 29 secures the arm to the stud, whereby relative vibratory movements cause the head 21 to reciprocate within the housing and compress the respective elements 22.

After the load weight and range of vibration to be absorbed are ascertained, the displacement area for the compressible elements necessary to accommodate such vibration, may be regulated by the screw threaded adjustment of the enclosing housing. The extreme sensitiveness or excessive responsiveness, may be eliminated by placing the elements under an initial compression, and thereafter displacement is restricted within the desired limit. Thus a very high grade of soft rubber may be employed, insuring a free and ready yielding or deformation up to the limit. After the limit is reached, the further movement is positively restrained and the mounting becomes rigidly resistant. Therefore, relative movements of large amplitude and vibration periods are effectually overcome or prevented while the small movements are readily cushioned.

Since the main frame is insulated from the sharp, short, regularly occurring stresses resulting from the internal operation of the engine, it is freed from the damaging strains, adding comfort for passengers and assuring better motor operation.

Having described my invention, I claim:

1. The combination with a supporting frame and an engine or like body having unbalanced moving parts that set up small amplitude vibrations, of a flexible mounting connection between the engine and frame to absorb the inherent engine vibration and prevent its transmission to the frame, including a pair of brackets secured centrally to the engine and frame respectively, and having cooperating lateral projections to each side of the central attachments, a cushioning element disposed between each set of cooperating projections, each consisting of a pin carried by one of the projections, a pair of sleeves surrounding the pin, a plate interposed between adjacent ends of the sleeves, a nut on the pin to hold the sleeves and plate in rigid assembled relation with the projection, an open ended container adjustably secured at its open end to the other of said projections and into which said pin assembly extends, an elastic deformable body interposed between the projection at the open end of the casing, and one side of the plate, and a second elastic deformable body interposed between the closed end of the container and the other side of the plate whereby said bodies are completely enclosed within and their deformation limited by said container, which container by its adjustment effects an initial deformation of both bodies to control to a predetermined extent the range of relative movement permitted.

2. A cushioning device for preventing the transmission to a supporting frame of small amplitude vibrations set up by the unbalance of moving parts of an engine or like body mounted in the frame and which rigidly resists relative movement of the engine and frame after a predetermined limit is reached, including in combination with an engine and a supporting frame therefor, of a casing to be interposed between parts on the engine and frame and adjustably connected with one of said parts, a pin on the other part extending into said casing, a pair of spacer sleeves on the pin, a ring interposed and held by said spacer sleeves, and a pair of elastic deformable elements located on opposite sides of said ring and completely enclosed within and limited in deformation by said casing, the adjustment of which casing initially deforms said elements to definitely control the extent of deformation necessary to accommodate relative movement between the engine and frame within the predetermined range to cushion small vibrations and rigidly resist larger vibrations.

3. A cushioning device for preventing the transmission to a supporting frame of small amplitude vibrations set up by the unbalance of moving parts of an engine or like body mounted in the frame and which rigidly resists relative movement of the engine and frame after a predetermined limit is reached, including in combination with an engine and a frame, of a casing to be interposed between parts on the engine and frame and fastened to one of said parts, a stud fastened to the other of said parts, a pair of spacer sleeves on said stud, a plate-like member held between said sleeves and within the casing, a nut on the stud to hold the parts in assembled relation and elastic deformable material on opposite sides of said plate-like member and confined within said casing under initial deformation and held by the casing against deformation beyond a predetermined limit, whereby small amplitude vibrations are cushioned and large movements rigidly resisted.

In testimony whereof I affix my signature.

CHARLES R. SHORT.